United States Patent [19]

Berggren et al.

[11] Patent Number: 4,863,262
[45] Date of Patent: Sep. 5, 1989

[54] MOTION PICTURE PROJECTOR WITH REDUCED PICTURE JUMP

[75] Inventors: Glenn M. Berggren, Claremont, Calif.; Jerry Kampel, Pomona, both of Calif.

[73] Assignee: Optical Radiation Corporation, Azusa, Calif.

[21] Appl. No.: 141,207

[22] Filed: Jan. 6, 1988

[51] Int. Cl.⁴ .............................................. G03B 1/24
[52] U.S. Cl. .................................. 352/187; 352/189; 352/160; 352/163
[58] Field of Search ............... 352/187, 189, 190, 160, 352/161, 162, 163, 188

[56] References Cited

U.S. PATENT DOCUMENTS

| | | |
|---|---|---|
| 777,381 | 12/1904 | Ladd . |
| 955,840 | 4/1910 | Messter . |
| 1,554,557 | 9/1925 | Hall . |
| 1,801,969 | 4/1931 | Moulton . |
| 2,349,941 | 5/1944 | Cramwinckel ........................ 352/163 |
| 2,747,457 | 5/1956 | Wengel . |
| 3,286,536 | 11/1966 | Hallmann . |
| 3,855,873 | 12/1974 | Fletcher et al. . |

FOREIGN PATENT DOCUMENTS 482353 12/1916 France ................................ 352/189
254385 7/1927 Italy ................................... 352/189
517186 2/1955 Italy .

Primary Examiner—Monroe H. Hayes
Attorney, Agent, or Firm—Christie, Parker & Hale

[57] ABSTRACT

A motion picture projector substantially free of picture jump comprises a gate assembly having a projection aperture and a light source for projecting light through the aperture and focusing lens and onto a screen. The film is intermittently advanced through the gate assembly by an intermittent sprocket which is intermittently rotated by a modified Geneva mechanism. The Geneva mechanism comprises a star wheel having a plurality of radially extending slots separated by curved surfaces. A rotating cam has a ring which slidably engages the curved surface of the star wheel and a pin which engages the slots as the cam rotates, rotating the star wheel a fraction of a rotation for each full rotation of the cam. The cam has a tension area adjacent the pin and a relief area remote from the pin. The tension area engages the curved surfaces of the star wheel closely, preventing backward rotation. The relief area provides a gap between ring and curved surface to allow the star wheel a small amount of backward rotation, thus relieving tension on the film during periods when the film is stationary.

3 Claims, 5 Drawing Sheets

MOTION PICTURE PROJECTOR WITH REDUCED PICTURE JUMP

FIELD OF THE INVENTION

This invention relates to motion picture projectors and, more particularly, to a motion picture projector having reduced picture jump.

BACKGROUND OF THE INVENTION

In motion picture projectors, motion picture film is intermittently advanced through a gate having a projection aperture. The film is moved or advanced until a frame is in alignment with the projection aperture and then held stationary for a discrete period of time during which light is passed during two discrete time periods through the aperture, film frame, and then a focusing lens, and onto a screen. This is followed by movement of the film until the next frame is in alignment with the projection aperture. This cycle of movement followed by a stationary period typically occurs 24 times each second.

One problem associated with the use of motion projectors is the problem of vertical picture steadiness, typically referred to as picture "jump". Picture "jump" is manifested by a slight blurring of the picture on the screen which is particularly noticeable at horizontally extending lines on the screen.

Although reducing picture jump to below one-third of one percent of the picture height has happened many years ago, obtaining less than one-fourth of one percent has been difficult and has been set as the industry's standard. Many types of mechanical designs have been made over the years to reduce the picture jump. However, picture jump has not been fully understood nor has it been eliminated.

SUMMARY OF THE INVENTION

The present invention provides a film projector which is substantially free of picture jump. The projector comprises a gate assembly having a projection aperture through which motion picture film is advanced by an intermittently advancing means. Light from a suitable light source is passed through the frame of the film aligned with the aperture to project a picture onto a screen.

The intermittent advancing means advances the film at select intervals so that successive frames of the film are aligned with the projection aperture. This occurs typically 24 times per second. After each advancement of the film, the film remains stationary for a select period of time. During the stationary period, light from a suitable light source is passed through the frame for two discrete time periods separated by a period during which the light is blocked.

During advancement of the film, the film in the gate assembly is under tension. It has been found that picture jump can be reduced and substantially eliminated by reducing the tension on the film in the gate assembly during the period when the film is stationary. Accordingly, the projector of the present invention comprises means for reducing tension on the film in the gate assembly during the periods of intermittent advancement when the film is stationary.

A preferred means for intermittently advancing the film comprises an intermittent sprocket which engages the perforations along the edges of the film. The intermittent sprocket is connected to the star wheel of a Geneva mechanism. The Geneva mechanism comprises a star wheel having a plurality of radially extending slots separated by a curved cam-engaging surface of generally constant radius. A cam is provided having a raised, generally circular ring which engages the curvate surfaces of the star wheel. The ring of the cam has a break along a portion of its length. The cam comprises a pin positioned radially outwardly from the ring and at about the mid-point of the break in the ring. The pin engages the radially extending slots of the star wheel as the cam rotates, causing the star wheel to rotate until the pin releases the slot. In such a mechanism, one rotation of the cam causes a star wheel having four radially extending slots to rotate one-quarter turn.

In such an embodiment, preferred means for reducing the tension on the film during the period when film is stationary comprises a relief area in the ring of the cam. The relief area is formed by reducing the radius of the outer surface of the ring over a portion of the ring remote from the pin. The outer surface of the portions of the ring adjacent the pin has about the same radius as the radius of the curved surface of the star wheel and forms a tension area of the ring. The portions of the ring remote from the pin have a slightly reduced radius and form a relief area. The relief area provides a small gap between the ring and the curved surfaces of the star wheel and allows the star wheel and hence, intermittent sprocket, to rotate backwardly very slightly during those periods when the film is stationary, thereby reducing tension on the film when the film is stationary.

BRIEF DESCRIPTION OF THE DRAWINGS

These and other features and advantages of the present invention will be better understood by reference to the following detailed description when considered in conjunction with the accompanying drawings wherein.

DETAILED DESCRIPTION

Figure 1:
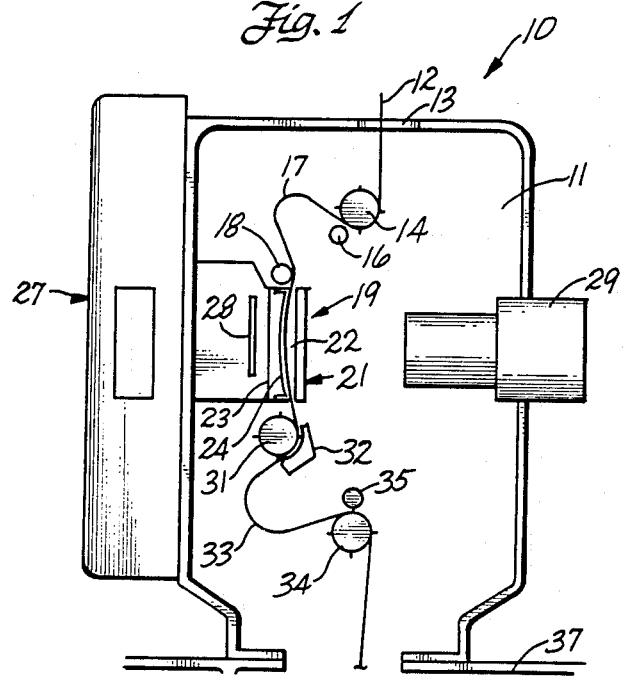
FIG. 1 is a schematic view of a film projector showing the threading arrangement of the film.

A conventional motion picture project or suitable for use with the present invention is shown in FIG. 1. The projector 10 comprises a compartment 11 into which motion picture film 12 is passed. The film 12 enters the compartment 11 through an opening 13 and engages a feed sprocket 14 which rotates at constant speed. The film 12 curves partially around the feed sprocket 14 and passes between the feed sprocket 14 and a roller 16 which keeps the film in engagement with the feed sprocket. The film 12 then forms a first loop 17 and engages another roller 18 which positions the film for entering the top of a gate assembly 19.

Figure 2:
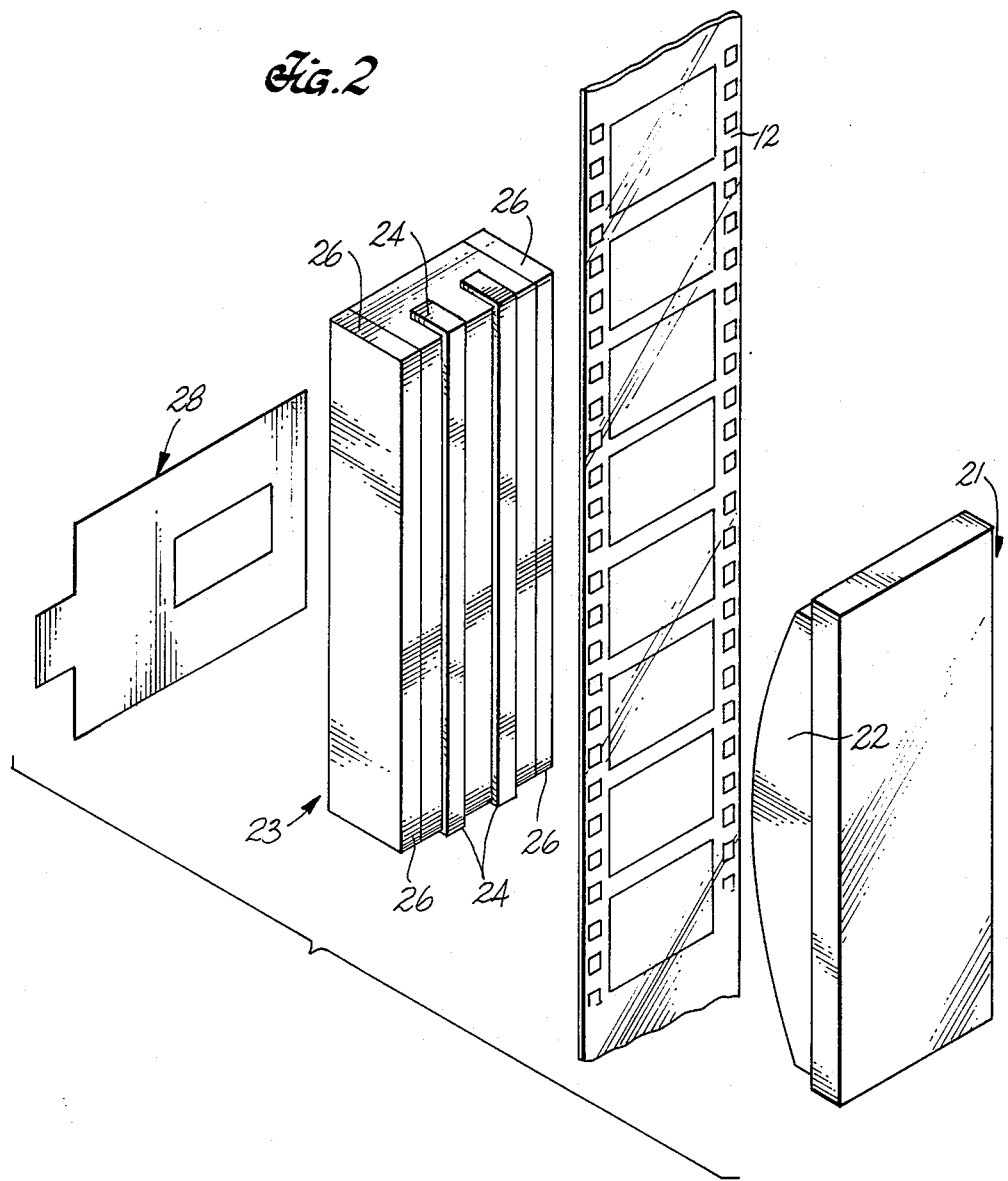
FIG. 2 is an exploded perspective view of a gate assembly showing a gate, trap and aperture plate.

With reference to FIG. 2, the gate assembly 19 comprises a gate 21 having a pair of spaced apart, curved shoes 22. The gate assembly 19 also comprises a trap 23 having a pair of spaced apart, steel bands 24 deformably by the shoes 22. In the gate assembly 19, the film 12 passes between the shoes 22 and the bands 24 which frictionally engage the edges of the film to resist advancing movement of the film 12. The trap 23 also comprises a pair of studio guides 26 positioned adjacent and laterally outwardly from the bands 24. The studio guides 26 prevent lateral movement of the film within the gate assembly.

The trap 23 and gate 21 each comprise an opening through which a beam of light from light source 27 passes. An aperture plate 28 is interposed in the path of the light beam to control the size of the beam exiting the projector. Light from the light source passes through the aperture plate 28, trap 23, film 12 and gate 21, and then through a lens 29 for focusing the light onto a screen.

The film 12 emerges from the bottom of the gate assembly 19 and engages an intermittent sprocket 31 curving partially around the intermittent sprocket 31 and passing between the intermittent sprocket 31 and a sprocket pad 32 which maintains engagement between the intermittent sprocket 31 and the film 12.

The film 12 then forms a second loop 33 and engages a second feed sprocket 34 which rotates at the same constant speed as the first feed sprocket. The film passes between the second feed sprocket 34 and an adjacent roller, and then downwardly into a second compartment 37 comprising a sound head (not shown) wherein sound recording on the film is converted into electronic signals which are, in turn, delivered to speakers for converting the electronic signals into audible signals.

Figure 3:
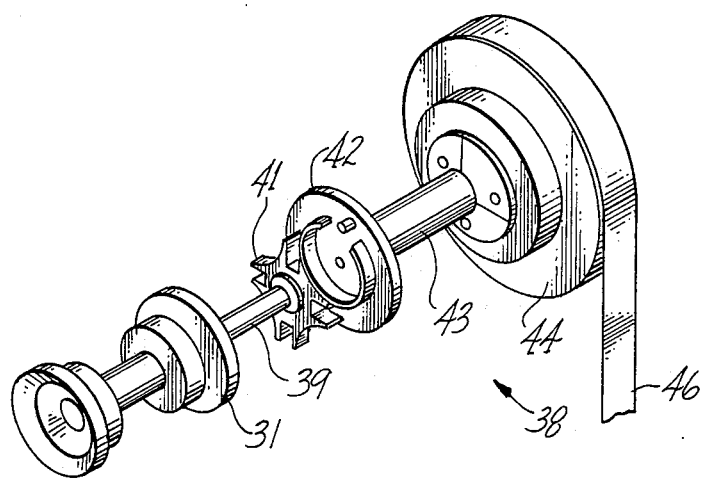
FIG. 3 is a perspective view of the intermittent movement assembly.

With reference to FIG. 3, the intermediate sprocket 31 is part of an intermittent movement assembly 38 constructed in accordance with the present invention. In the intermittent movement assembly 38, the intermittent sprocket 31 is mounted at one end of a first shaft 39. At the other end of the first shaft 39 is a star wheel 41. The star wheel 41 is mounted adjacent a cam 42 which is mounted at the end of a second shaft 43. At the opposite end of the second shaft 43 is a fly wheel 44 which is driven, i.e., rotated, by a motor (not shown). The star wheel 41 and cam 42 form a modified Geneva mechanism.

Figure 4:
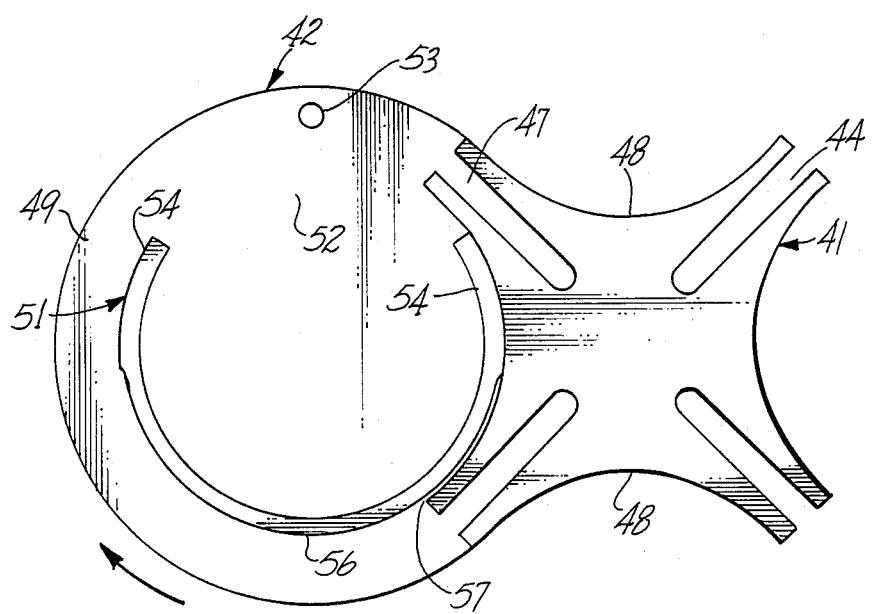
FIG. 4 is a side view of the modified Geneva mechanism showing the pin of the cam engaging the slot of the star wheel.

With reference to FIG. 4, the star wheel comprises four symmetrically located radially extending slots 47. The slots 47 are separated by curved surfaces 48 of generally constant radius. The cam 42 comprises a generally circular plate 49 and a generally circular ring 51 protruding outwardly from the surface of the plate 49. The ring 51 is not a complete circle but comprises a break or gap 52. In the embodiment shown, the ring 51 extends in an arc of about 300°, providing a gap of approximately 60° between the ends of the ring 51.

Centered between the ends of the ring 51 and spaced apart radially outwardly from the ring is a generally cylindrical pin 53. The diameter of the pin 53 is not critical but preferably is about the same as or slightly less than the width of the slots 47 in the star wheel 41.

The ring 51 is divided into two distinct areas., a tension area 54 and a relief area 56. The end portions of the ring 51 adjacent the pin 53 have a constant outer radius about the same as the radius of the curved surfaces 48 of the star wheel 41 and form the tension area 54 of the ring 51. Remote from the pin 53, the outer radius of the ring 51 is reduced slightly from that of the tension area 54 to form the relief area 56. Preferably, the relief area spans an arc of the ring of from about 70° to about 180° wide. However, if desired, the relief area may span an area 210° or more.

As the cam 42 rotates, the tension area 54 of the ring 51 ahead of the pin 53 slidably engages the curved surface 48 of the star wheel 41 preventing the star wheel 41 from rotating and aligning the pin 53 with the slot 47 of the star wheel 41. The pin 53 then engages the slot 47, rotating the star wheel 41 one-quarter turn and causing the next adjacent curved 48 of the star wheel 41 to then engage the tension area 54 of the ring 51 following the pin 53. As the cam 42 continues to rotate, the pin 53 releases the slot 47 of the star wheel 41. Further rotation of the cam 42 brings the relief area 56 of the ring 51 into position adjacent the curved surface 48 of the star wheel 41.

Figure 5:
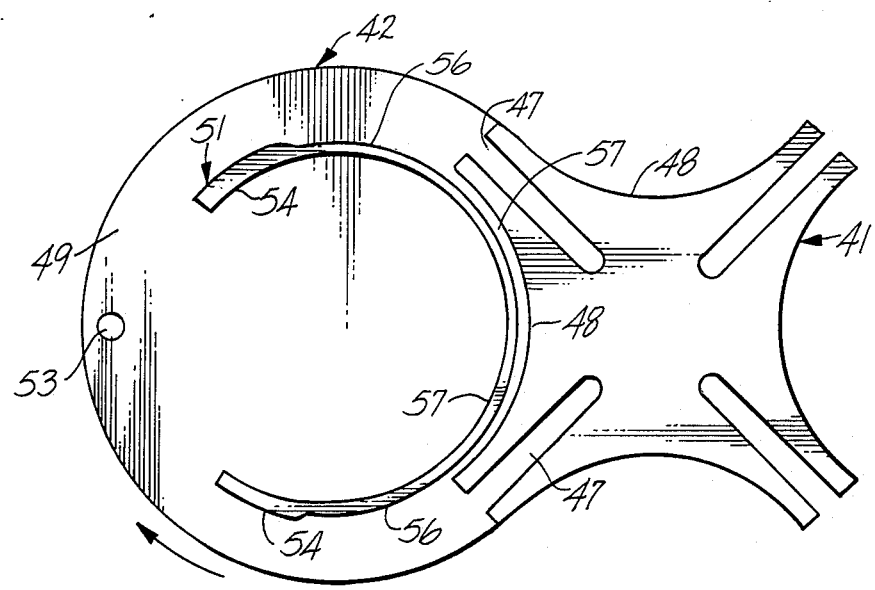
FIG. 5 is a side view of the modified Geneva mechanism showing the curved surface of the star wheel adjacent the relief area of the cam.

Because of the reduced radius of the relief area 56, there is a slight gap 57, as shown in FIG. 5, between the ring 51 in the relief area 56 and the curved surface 48 of the star wheel 41. This introduces a slight amount of "play" into the star wheel 41, allowing slight rotation of the star wheel 41 in either direction. As the tension area 54 of the ring 51 again rotates into contact with the curved surface 48 of the star wheel, the "play" is eliminated. The above cycle repeats for each rotation of the cam 42.

The introduction of play into the star wheel 41 and hence intermittent sprocket 31 occurs while the film 12 is stationary and has been found to substantially eliminate picture jump caused by the projector. While not being bound by theory, it is believed that picture jump resulting from the projector occurs due to thermal contraction of the portion of the film between the gate assembly and the intermittent sprocket. During the time that the film is stationary within the gate assembly, light is passed through the frame aligned with the aperture. This occurs twice. That is, once the film becomes stationary within the gate assembly, a shutter or the like opens to allow light from the light source to pass through the frame and then closes a first time to block the light and opens a second time to provide two images of that frame on the screen. That is, each frame is projected onto the screen twice for two discrete time periods separated by a period of interruption. The shutter then closes a second time to block the light while the next frame is advanced into place under tension.

When a new frame is advanced into position in the gate assembly, it is relatively cool. The frames exiting the gate assembly, on the other hand, are either warm or hot, having been heated by the projector lamp. When the shutter opens to pass light through the newly positioned frame, the light heats that new frame. This occurs as the previous frames are cooling. When the shutter closes for the first time, the several frames between the newly aligned frame and the intermittent sprocket have cooled for about 1/100 of a second as the newly aligned frame also begins to cool. Being a plastic medium, the film contracts as it cools. With the intermittent and gate assembly being in rigidly fixed locations, the tension in the film increases as the film contracts to a point which exceeds the frictional forces holding the film stationary in the gate assembly.

To accommodate this increase in tension on the film, it is believed that the film lurches downwardly a small distance, e.g., about 0.001 to about 0.004 inch. This means that when the shutter opens the second time on that newly aligne, framed it is not in its exact previous position. This slight difference in frame location is seen as picture jump on the screen.

The present invention, therefore, provides a relief for the increased tension in the film during the time when the newly aligned frame remains stationary in the gate assembly. This reduces and preferably, substantially eliminates downward movement of the newly aligned frame due to increased tension in the film created by the thermal contraction of the film.

Thus, in the above described embodiment, one full rotation of the cam 42 results in one-quarter rotation of the star wheel 41 and hence, of the intermediate sprocket 31. This movement is sufficient to advance a new frame into alignment with the gate assembly aperture. Following each one-quarter rotation, there is a period where the star wheel 41, intermediate sprocket 31, and film 12 are stationary. During this stationary period wherein thermal contraction of the film introduces increased tension on the film, a slight amount of play is introduced into the star wheel 41 and intermittent sprocket 31 to accommodate that increase in tension.

The amount of play introduced into the star wheel 41 and intermediate sprocket 31 is dependent on the amount of decrease in the radius of the ring 51 in the relief area 56. The amount of decrease in the radius of the is not critical, but is sufficient to accommodate the increase in tension on the film between the gate assembly 19 and the intermediate sprocket 31 to thereby reduce and preferably substantially eliminate picture jump.

It is believed that the amount of frame movement causing picture jump is typically about 0.0015 to about 0.002 inch. Such a movement results in a jump of about one-fourth of one percent, i.e. 0.25%, of the picture height for 35 mm film. For an intermediate sprocket having a diameter of about 0.950 inch and a cam having a ring diameter in the tension area of about 1.135 inches, a reduction in the radius of the ring in the relief area of about 0.002" to about 0.0025" has been found suitable to reduce and substantially eliminate picture jump.

By means of the present invention, picture jump caused by the projector can be reduced to no more than about one-tenth of one percent, i.e. 0.14%, of the picture height and thereby provides a projector which is substantially free of picture jump. In addition to reducing picture jump, the present invention provides other advantages. For example, the present invention provides for reduced tension on the film in the gate assembly. This results in less frictional wear on the film. Also, because of tension on the film, the sprockets, particularly the intermittent sprockets, tend to enlarge the perforations in the film. If the perforations become too enlarged, the film cannot be used satisfactorily. By reducing tension on the film, the perforations do not enlarge as quickly and hence the film lasts longer.

The invention has been presented with reference to the presently preferred embodiment of the invention shown in the drawings. It is apparent, however, that many variations or modifications may be made in the above described structures and apparatus without departing from the scope of the invention.

For example, it is understood that any means for intermittently advancing the film may be utilized. It is also understood that any method for relieving tension in the portion of the film in the gate assembly during those periods wherein the film is stationary may be used. Hence, any suitable method for introducing play into the intermittent sprocket during the time that a film is stationary may be used.

Accordingly, the foregoing description should not be read pertaining only to the precise structures and apparatus described, but rather should be read consistent with and as support for the following claims which are to have their fullest fair scope.

What is claimed is:

1. A motion picture projector substantially free of picture jump comprising:

a gate assembly having a projection aperture;

a light source for directing a beam of light through the projection aperture and onto a screen;

intermittent advancing means for intermittently advancing film through the gate assembly so that successive frames of the film are advanced into alignment with the projection aperture and held stationary for a select period of time comprising:

a rotatable intermittent sprocket for engaging the film so that rotation of the intermittent sprocket advances the film through the gate assembly;

a rotatable star wheel connected to the intermittent sprocket so that rotation of the star wheel rotates the intermittent sprocket, said star wheel having a plurality of radially extending slots with a curved surface having a generally constant radius between adjacent slots;

a rotatable cam adjacent the star wheel comprising a pin which engages a slot of the star wheel for rotating the star wheel a fraction of a rotation for each rotation of the cam and a ring comprising a tension area adjacent the pin having a curved surface of generally constant radius about the same as the radius of the curved surfaces of the star wheel for slidably engaging the curved surfaces of the star wheel for preventing backward rotation of the star wheel during engagement and aligning the slot of the star wheel with the pin of the cam, and a relief area of the ring remote from the pin having a generally constant radius less than the radius of the tension area to thereby allow the star wheel and the intermittent sprocket to rotate backwardly a select distance during at least a portion of each period of time that the pin of the cam does not engage the slot of the star wheel and the film is stationary, to reduce tension on the portion of the film in the gate assembly during those stationary periods; and means for rotating the cam.

2. A motion picture projector as claimed in claim 1 wherein the relief area spans an arc of from about 70° to about 210°.

3. A method for reducing picture jump in a motion picture projected onto a screen by a motion picture projector comprising a gate assembly with a projection aperture, said method comprising:

intermittently advancing a motion picture film under tension through the gate assembly of a motion picture projector so that successive frames of the film are advanced into alignment with the projection aperture and held stationary for a select period of time;

passing a beam of light through the film and projection aperture and onto a screen while the film is stationary; and reducing tension on the portion of the film in the gate assembly during at least a portion of the time that the film is stationary

* * * * *